United States Patent
Schanuel et al.

(10) Patent No.: US 11,988,279 B2
(45) Date of Patent: May 21, 2024

(54) FILLING AN ARMATURE SPACE OF AN ACTUATOR

(71) Applicant: ZF Friedrichshafen AG, Friedrichshafen (DE)

(72) Inventors: Robert Schanuel, Constance (DE); Thilo Schmidt, Meckenbeuren (DE); Jonas Knör, Erbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/308,864

(22) Filed: Apr. 28, 2023

(65) Prior Publication Data
US 2023/0349462 A1 Nov. 2, 2023

(30) Foreign Application Priority Data
Apr. 29, 2022 (DE) ..................... 10 2022 204 198.4

(51) Int. Cl.
*F16H 61/02* (2006.01)
*F16H 61/12* (2010.01)
*F16H 61/28* (2006.01)
*F16H 61/32* (2006.01)

(52) U.S. Cl.
CPC ..... *F16H 61/0251* (2013.01); *F16H 61/0206* (2013.01); *F16H 61/12* (2013.01); *F16H 2061/0253* (2013.01); *F16H 2061/126* (2013.01); *F16H 2061/2853* (2013.01); *F16H 61/32* (2013.01)

(58) Field of Classification Search
None
See application file for complete search history.

(56) References Cited

U.S. PATENT DOCUMENTS

| | | | |
|---|---|---|---|
| 2010/0111727 A1* | 5/2010 | Yamagata | H01F 7/1607 417/415 |
| 2015/0013800 A1 | 1/2015 | Mayr et al. | |
| 2017/0089371 A1* | 3/2017 | Schuller | F16H 61/0251 |

FOREIGN PATENT DOCUMENTS

DE 102013213713 A1 1/2015

* cited by examiner

*Primary Examiner* — Timothy Hannon
(74) *Attorney, Agent, or Firm* — Dority & Manning, P.A.

(57) ABSTRACT

A method for filling an actuator in a gearbox fills the actuator only when the gearbox is in a passive state by virtue of fluid being introduced into an armature space of the actuator by way of axial movements of an armature rod when the actuator has been fluidically connected to a fluid-filled fluid space of the gearbox.

11 Claims, 1 Drawing Sheet

FILLING AN ARMATURE SPACE OF AN ACTUATOR

CROSS-REFERENCE TO RELATED APPLICATION

The present application is related and claims priority to 102022204198.4 filed in the German Patent Office on Apr. 29, 2022, which is incorporated by reference in its entirety for all purposes.

FIELD OF THE INVENTION

The present invention relates generally to an electromagnetic actuator for an assembly with a fluid space, for example a gearbox.

TECHNICAL BACKGROUND

In the case of multi-stage motor vehicle automatic gearboxes known from practice, or automated manual motor vehicle gearboxes, hydraulic shift elements designed as clutches or brakes are used to engage different transmission ratio stages of the gearboxes. Here, to change or engage a desired transmission ratio stage of the gearbox, the hydraulic shift elements are charged with fluid pressure, or ventilated (with fluid pressure being dissipated), in accordance with this transmission ratio stage. Fluid valves with electromagnetic actuators are used for this purpose. Such a fluid valve is disclosed for example in DE 10 2013 213 713 A1.

SUMMARY OF THE INVENTION

Example aspects of the present disclosure provide:
a method for filling an actuator in a gearbox, in particular of a vehicle, wherein it is ensured that the actuator is filled only when the gearbox is in a passive state by virtue of fluid being introduced into an armature space of the actuator by way of axial movements of an armature rod when the actuator has been fluidically connected to a fluid-filled fluid space of the gearbox.

The actuator is configured to actuate a shift element of a gearbox and is connected to a control unit of a gearbox. In a signal transducer context, actuators are the counterpart to sensors and form the final control element in a closed control loop. During a closed-loop control operation, said actuators convert the signals into actions by which the controlled variable is influenced. One example is the opening and closing of a valve.

Fluids are liquids or gases. In example aspects, a suitable fluid is, for example, oil.

A fluid space is a space filled with fluid. This may be referred to as an oil space if the fluid is oil.

If two components are fluidically connected, this means that fluid can flow from one component into the other component. Herein, a fluidic connection is assumed to be present even if the fluidic connection is dependent on further conditions, for example the operation or the operating mode of the actuator.

A passive state of the gearbox means that the gearbox is functional but is not presently in operation, for example when the gearbox is in an idle mode and/or in vehicles in a park mode.

Example aspects of the present disclosure fill an actuator of a gearbox at that time, e.g., operation or in the passive state, such that it is not imperatively necessary to arrange a period of time for this purpose in which the actuator is filled and which delays other processes that are dependent on the filling.

It is thus conceivable for a separate filling operation at a factory to be omitted. It is thus not imperatively necessary to provide a filling station at the factory. Furthermore, dispersal of oil during the manufacturing process can be reduced. Dispersal of oil makes it necessary to expend effort in cleaning transport containers and assembly equipment, and places a burden on the environment.

In relation to filling of the actuator whilst the gearbox is in operation, example aspects of the invention reduce the introduction of dirt into the actuator that arises owing to integrated pump mechanisms. Introduction of dirt causes a change in the flow-pressure characteristic of the hydraulic system.

According to one preferred example development of the invention, the actuator has a ventilation gap such that air escapes from the actuator, in particular the armature space, into the surroundings of the actuator by virtue of the armature rod performing axial movements, if air is situated in the armature space. Here, the ventilation gap is preferably dimensioned such that no exchange of air takes place when the actuator is not in operation.

It is thus possible for air to be displaced out of the armature space whilst fluid is drawn in.

According to one preferred example development of the invention, the armature rod is moved by a restoring spring and/or as a result of pressure equalization. It can thus be achieved that the volume situated in the actuator does not change owing to the position of the armature rod. By virtue of the actuator alone being immersed in fluid, it is preferably the case, owing to small gaps or opening dimensions, that neither oil is supplied nor air is discharged.

Through active actuation of the actuator, it is intended to move the armature in order to draw fluid into the armature space, for example owing to the installation position of said actuator in fluid.

According to one preferred example development of the invention, the filling of the actuator is started when a gearbox temperature, in particular a temperature of the fluid in the fluid space, lies in a predetermined temperature range with an upper temperature limit and/or with a lower temperature limit. It is thus ensured that the fluid has a suitable viscosity.

According to one preferred example development of the invention, the filling of the actuator is started when the vehicle is tested, in particular on a test stand, and/or the vehicle is serviced, in particular in a workshop, if the actuator has been installed in a vehicle gearbox. It is accordingly conceivable for the filling of the actuator to be initiated by a specialist. It is thus ensured that disruptive factors during the filling operation are minimized, or the filling is performed under optimal ambient conditions.

According to one preferred example development of the invention, the filling of the actuator is started when the gearbox is in a park mode and/or in an idle mode. The filling operation can thus be assumed not to be a disruptive interruption of the use of the vehicle.

According to one preferred example development of the invention, the filling of the actuator is started before the gearbox is delivered to an end customer. It is accordingly conceivable for the filling of the actuator to be initiated by a specialist. It is thus ensured that disruptive factors during the filling operation are minimized, or the filling is performed under optimal ambient conditions. It is thus also ensured that the end customer does not need to start a filling operation before commencing use of the gearbox. This can improve customer satisfaction.

According to one preferred example development of the invention, before the actuator is filled, it is checked whether a person is seated on a driver's seat of the vehicle, if the actuator has been installed in a vehicle gearbox. Provision may be made here for the filling operation to be started only when a driver is present, or is not present, in the vehicle.

According to one preferred example development of the invention, the filling of the actuator is started if a diagnostic function identifies anomalies in the operation of the gearbox, in particular during gearshifts. Gearbox faults can thus be eliminated with little effort.

It is self-evident that an actuator for installation in a gearbox, which actuator is configured to carry out the method according to any one of the preceding example developments, having a ventilation gap via which air can escape from the armature space of the actuator, wherein the armature rod of the actuator is configured to draw fluid into the armature space by way of axial movements, is advantageous.

It is self-evident that a gearbox for a vehicle, having a fluid space and having at least one actuator as described above, wherein the actuator and the fluid space are fluidically connected when the actuator is filled by way of a method as described above, wherein the fluidic connection can be shut off, is advantageous.

SUMMARY OF THE DRAWINGS

The present invention is explained in more detail below with reference to the exemplary embodiments given in the schematic figures of the drawings. In the figures.

Figure 1:
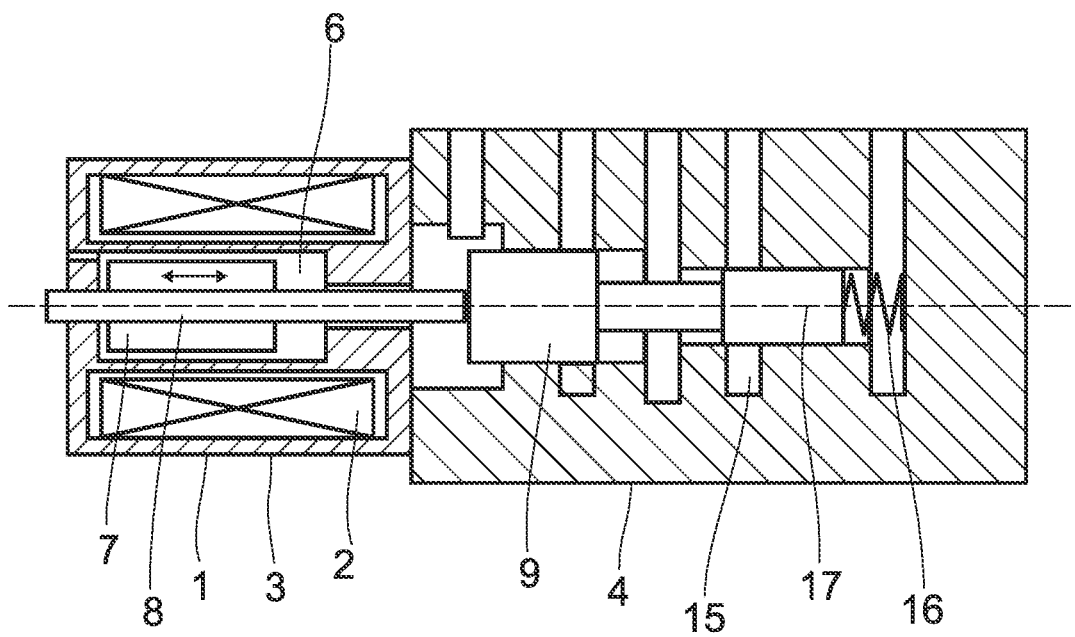
FIG. 1 shows a schematic sectional view of an electromagnetic actuator according to an example embodiment of the invention.

The accompanying drawings are intended to provide further understanding of the embodiments of the invention. They illustrate embodiments and serve, in connection with the description, to explain principles and concepts of the invention. Other embodiments and many of the advantages that are mentioned become apparent from the drawings. The elements of the drawings are not necessarily shown to scale with respect to one another.

In the figures of the drawings, elements, features and components that are identical, functionally identical and act in the same way are each provided with the same reference signs, unless indicated otherwise.

DESCRIPTION OF EXEMPLARY EMBODIMENTS

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Example aspects of the invention will be described below with reference to oil as a fluid. It is self-evident that the selection of oil as a fluid is merely exemplary and is not limiting.

FIG. 1 is a schematic sectional view of an assembly with an electromagnetic actuator 1 and a valve 9. The valve 9 is surrounded by a valve housing 4, and the actuator 1 is surrounded by an actuator housing 3. The actuator 1 has an electromagnet 2 and has an armature with a throttle 7 and with an armature rod 8.

Together with the housing 14, the electromagnet 2 forms an interior space of the actuator, in which there is situated an armature space 6 in which the armature with the throttle 7 and the armature rod 8 is received. In FIG. 1, the throttle 7 is configured as an armature restrictor. The armature rod 8 is guided within the armature restrictor.

If the assembly with the actuator 1 and with the valve 9 is fluidically connected to an oil space, the actuator fills itself by way of axial strokes of the actuator 1, if the actuator 1 has not already been filled with fluid. The filling is performed by virtue of fluid, in this case oil, creeping from the oil space into the armature space 6.

By controlling the actuator 1, it is the intention for the actuator 1 to be operated outside of the primary intended purpose of the actuator 1, such that air inclusions are avoided or eliminated. The actuator 1 includes an electromagnet 2 with low inherent pumping characteristics, by virtue of the actuator being designed such that the volume situated in the actuator does not change owing to the position of the armature rod 8. The actuator 1 furthermore has a sealed gap (not illustrated in FIG. 1) to a filled oil space, and a path for discharging possible air inclusions, said path being configured as a ventilation gap 15.

By virtue of the actuator 1 alone being immersed, the small cross sections of the gaps mean that neither oil is supplied nor air is discharged. By active actuation of the actuator, which is ensured in FIG. 1 by the spring 16, the armature rod 8 is moved such that air is displaced out of the armature space and oil is replenished. In the case of the actuator according to FIG. 1, this is ensured owing to the installation position in oil. The function for filling the actuator is called upon only when the gearbox is not in normal operation.

Said filling may for example be performed when the gearbox is at the programming station of the manufacturing process for the transmission of data and/or when a vehicle with the gearbox is parked after a journey, or the driver adjusts the pressure supply and/or the vehicle is in a park mode.

The armature rod 8 is formed along a longitudinal axis 17 of the actuator 1 and thus also defines the axial movement direction of the throttle 7 or of the armature rod.

Figure 2:
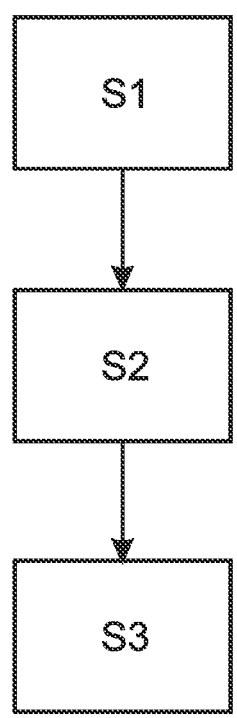
FIG. 2 shows a schematic block diagram of a method according to an example embodiment of the invention.

FIG. 2 shows a schematic block diagram of a method for filling an electromagnetic actuator with oil. The method includes the steps S1 to S3. In the step S1, a gearbox with an oil-filled oil space is provided, wherein an actuator that is to be filled has been installed in the gearbox. In the step S2, it is ensured that the gearbox is in a passive gearbox state. In the step S3, a filling operation by way of one or more axial movements of the armature is started in order to fill the armature space with oil.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the

REFERENCE SIGNS

1 Actuator
2 Electromagnet
3 Actuator housing
4 Valve housing
6 Armature space
7 Throttle
8 Armature rod
9 Valve
15 Ventilation gap
16 Spring
S1-S3 Method steps

The invention claimed is:

1. A method for filling an actuator (1) in a vehicle gearbox, comprising:
 filling the actuator (1) when the gearbox is in a passive state by introducing fluid into an armature space (6) of the actuator (1) by axial movements of an armature rod (8) when the actuator (1) is fluidically connected to a fluid-filled fluid space of the gearbox.

2. The method of claim 1, wherein the actuator (1) comprises a ventilation gap (15), and air escapes from the actuator (1) by the axial movements of the armature rod (8) when air is situated in the armature space (6).

3. The method of claim 1, wherein a spring (16) and/or a pressure equalization move the armature rod (8) during the axial movements of the armature rod (8).

4. The method of claim 1, wherein the filling of the actuator (1) begins when a temperature of the fluid in the fluid space is within a predetermined temperature range.

5. The method of claim 1, wherein the filling of the actuator (1) begins when the vehicle is tested on a test stand and/or when the vehicle is serviced in a workshop.

6. The method of claim 1, wherein the filling of the actuator (1) begins when the gearbox is in a park mode and/or in an idle mode.

7. The method of claim 1, wherein the filling of the actuator (1) begins before the gearbox is delivered to an end customer.

8. The method of claim 1, further comprising, before the filling of the actuator (1), checking whether a person is seated on a driver's seat of the vehicle.

9. The method of claim 1, further comprising performing a diagnostic function to identify anomalies in the operation of the gearbox during gearshifts, wherein the filling of the actuator (1) comprises filling of the actuator (1) after the diagnostic function identifies the anomalies.

10. An actuator for installation in a gearbox, wherein:
 the actuator is configured to implement the method of claim 1;
 the actuator comprises a ventilation gap;
 air is flowable from the armature space (6) through the ventilation gap; and
 the armature rod of the actuator is configured to draw the fluid into the armature space by way of the axial movements.

11. A gearbox for a motor vehicle, comprising:
 a fluid space;
 at least one actuator comprising a ventilation gap, air flowable from the armature space (6) through the ventilation gap, the armature rod of the actuator configured to draw the fluid into the armature space by way of the axial movements,
 wherein the actuator and the fluid space are fluidically connected when the actuator is filled via the method of claim 1, and
 wherein the fluidic connection is selectively closeable.

* * * * *